(12) United States Patent
Teggatz et al.

(10) Patent No.: US 9,653,944 B2
(45) Date of Patent: May 16, 2017

(54) VARIABLE POWER ENERGY HARVESTING SYSTEM

(71) Applicant: Triune Systems, LLC, Plano, TX (US)

(72) Inventors: Ross Teggatz, Plano, TX (US); Wayne Chen, Plano, TX (US); Brett Smith, Plano, TX (US); Eric Blackall, Plano, TX (US)

(73) Assignee: TRIUNE SYSTEMS, LLC, Plano, TX (US)

(*) Notice: Subject to any disclaimer, the term of this patent is extended or adjusted under 35 U.S.C. 154(b) by 0 days.

(21) Appl. No.: 14/982,893

(22) Filed: Dec. 29, 2015

(65) Prior Publication Data

US 2016/0134191 A1    May 12, 2016

Related U.S. Application Data

(63) Continuation of application No. 13/427,850, filed on Mar. 22, 2012, now Pat. No. 9,225,199.

(60) Provisional application No. 61/466,049, filed on Mar. 22, 2011.

(51) Int. Cl.
| | | |
|---|---|---|
| *G05F 3/06* | (2006.01) | |
| *H02J 7/34* | (2006.01) | |
| *H02J 7/00* | (2006.01) | |
| *H02J 7/35* | (2006.01) | |
| *H02M 1/32* | (2007.01) | |
| *H02M 3/158* | (2006.01) | |
| *H02J 7/04* | (2006.01) | |
| *H02J 3/38* | (2006.01) | |
| *H02M 1/00* | (2006.01) | |

(52) U.S. Cl.
CPC ...... *H02J 7/34* (2013.01); *H02J 7/00* (2013.01); *H02J 7/35* (2013.01); *H02M 1/32* (2013.01); *H02M 3/158* (2013.01); *H02M 3/1582* (2013.01); *H02J 3/383* (2013.01); *H02J 7/047* (2013.01); *H02M 2001/0009* (2013.01); *Y02E 10/56* (2013.01); *Y02E 10/563* (2013.01); *Y02E 10/566* (2013.01)

(58) Field of Classification Search
CPC ....... H02J 7/00; H02J 7/34; H02J 7/47; Y02E 10/56
USPC ....................................................... 307/151
See application file for complete search history.

*Primary Examiner* — Carlos Amaya
(74) *Attorney, Agent, or Firm* — Jackson Walker LLP; Christopher J. Rourk (57) ABSTRACT

The disclosed invention provides examples of preferred embodiments including systems for harvesting energy from variable output energy harvesting apparatus. The systems include energy harvesting apparatus for providing energy input to a switched mode power supply and a control loop for dynamically adjusting energy harvesting apparatus input to the switched mode power supply, whereby system output power is substantially optimized to the practical. Exemplary embodiments of the invention include systems for harvesting energy using solar cells in boost, buck, and buck-boost configurations.

18 Claims, 9 Drawing Sheets

VARIABLE POWER ENERGY HARVESTING SYSTEM

RELATED APPLICATIONS

This application is a continuation of U.S. patent Application Ser. No. 13/427,850, filed Mar. 22, 2012, now U.S. Pat. No. 9,225,199, which claims priority to and benefit of U.S. Provisional Patent Application Ser. No. 61/466,049, filed on Mar. 22, 2011, which is hereby incorporated by reference for all purposes as if set forth herein in its entirety.

TECHNICAL FIELD

The invention relates to electronic systems for the more efficient utilization of energy resources. More particularly, the invention relates to power control methods, systems, and microelectronic circuitry designed to facilitate the harvesting of useable power from variable power energy sources such as, for example, photovoltaic systems.

BACKGROUND

Systems for harvesting energy from renewable resources have long been pursued in the arts. One of the problems associated with engineering energy harvesting systems is the challenge of making maximum use of energy sources which may be intermittent in availability and/or intensity. Unlike traditional power plants, alternative energy sources tend to have variable outputs. Solar power, for example, typically relies on solar cells, or photovoltaic (PV) cells, used to power electronic systems by charging storage elements such as batteries or capacitors, which then may be used to supply an electrical load. The sun does not always shine on the solar cells with equal intensity however, and such systems are required to operate at power levels that may vary depending on weather conditions, temperature, time of day, shadows from obstructions, and even momentary shadows, causing solar cell power output to fluctuate. Similar problems with output variability are experienced with other power sources such as wind, piezoelectric, regenerative braking, hydro power, wave power, and so forth. It is common for energy harvesting systems to be designed to operate under the theoretical assumption that the energy source is capable of delivering at its maximum output level more-or-less all of the time. This theoretical assumption is rarely matched in practice. Ordinarily, systems are design to be robust enough for anticipated peak loads, but this is done at the expense of efficiency during operation at lower intensity levels.

Switch mode power supplies (SMPS) are commonly used in efforts to efficiently harvest intermittent and/or variable energy source output power for delivery to storage element(s) and/or load(s). The efficiency of the SMPS generally is fairly high, so much so that the power output of the SMPS is often almost equal to the power input to the SMPS. Careful planning and device characterization are often used to attempt to design a system capable of harvesting at the theoretical maximum power level. In a PV system, for example, the maximum power output of a solar cell peaks at a load point specific to the particular solar cell. This maximum power output point varies across different individual solar cells, solar cell arrays, systems in which the solar cells are used, and with the operating environment of system and solar cell. The maximum energy harvesting capability of the electronic system therefore depends on the solar cell characteristics and the characteristics of the load applied to the solar cell. One example of a typical application is an electronic system to harvest energy from a solar cell array in order to charge a battery. Battery charging systems commonly have multiple modes, which include fast charging, charging at full capacity (also called 1C charging), and trickle charging. A typical SMPS regulates output voltage and operates under the theoretical assumption that the power input is capable of delivering the maximum load requirements of the output. In practice, the output impedance of a PV cell is high, so as duty cycle changes, input voltage also changes, which changes the output power of the PV cell. Thus, there is a problem with efficiently exploiting the energy harvesting potential of PV systems and other low and/or variable intensity power sources.

In carrying out the principles of the present invention, in accordance with preferred embodiments, the invention provides advances in the arts with novel apparatus directed to harvesting energy under conditions of both low and high input power. In preferred embodiments, the apparatus includes systems and circuits configured to operate at low power levels and at power levels several orders of magnitude higher. Such systems are designed for harvesting and preferably storing energy available in an operating environment in which power input may vary by several orders of magnitude.

According to aspects of the invention, examples of preferred embodiments include systems for harvesting energy from variable output energy harvesting apparatus suitable for providing energy input to a switched mode power supply. A control loop includes logic for dynamically adjusting energy harvesting apparatus power input to the switched mode power supply, ultimately regulating the system output power signal produced by the switched mode power supply.

According to aspects of the invention, examples of the preferred embodiments include systems for harvesting energy using solar cells.

According to aspects of the invention, examples of preferred embodiments of systems for harvesting energy from variable sources include a boost configuration.

According to aspects of the invention, examples of preferred embodiments of systems for harvesting energy from variable sources include a buck configuration.

According to aspects of the invention, examples of preferred embodiments of systems for harvesting energy from variable sources include a buck-boost configuration.

The invention has advantages including but not limited to one or more of, improved energy harvesting efficiency, improved operating ranges for charging systems, and reduced costs. These and other potential advantageous, features, and benefits of the present invention can be understood by one skilled in the arts upon careful consideration of the detailed description of representative embodiments of the invention in connection with the accompanying drawings.

BRIEF DESCRIPTION OF THE DRAWINGS

The present invention will be more clearly understood from consideration of the following detailed description and drawings in which.

References in the detailed description correspond to like references in the various drawings unless otherwise noted. Descriptive and directional terms used in the written description such as right, left, back, top, bottom, upper, side, et cetera, refer to the drawings themselves as laid out on the paper and not to physical limitations of the invention unless specifically noted. The drawings are not to scale, and some features of embodiments shown and discussed are simplified or amplified for illustrating principles and features as well as advantages of the invention.

DESCRIPTION OF PREFERRED EMBODIMENTS

The variable power energy harvesting system of the invention may be embodied in several alternative configurations for efficiently harvesting energy during alternatively low and high power input conditions, such as a solar system for example, which may operate under both low and high insolation conditions wherein available input power may vary by orders of magnitude. In a solar powered system, for example, under low insolation conditions, such as cloudy outdoor, conditions or indoors, solar panel power output is greatly reduced. It is often nevertheless desirable to harvest the small amount of available energy. The harvested energy may be used to run a low-power system or may be stored in batteries or other storage elements. In low power battery operated systems, this harvested energy can be enough to eliminate drain from standby power, extending battery life. This can facilitate continual operation without the frequent need for additional external charging. It is also often desirable to have the capability to maximize energy harvesting under high insolation conditions with the same system. This can require multiple modes of operation to get the most power from a solar panel, when the available power can change by several orders of magnitude, such as when moving a portable solar powered system from within a building having artificial lighting out into direct sunlight. Due to these and other challenges and potential problems with the current state of the art, improved methods, apparatus, and systems for energy harvesting would be useful and advantageous.

Figure 1:
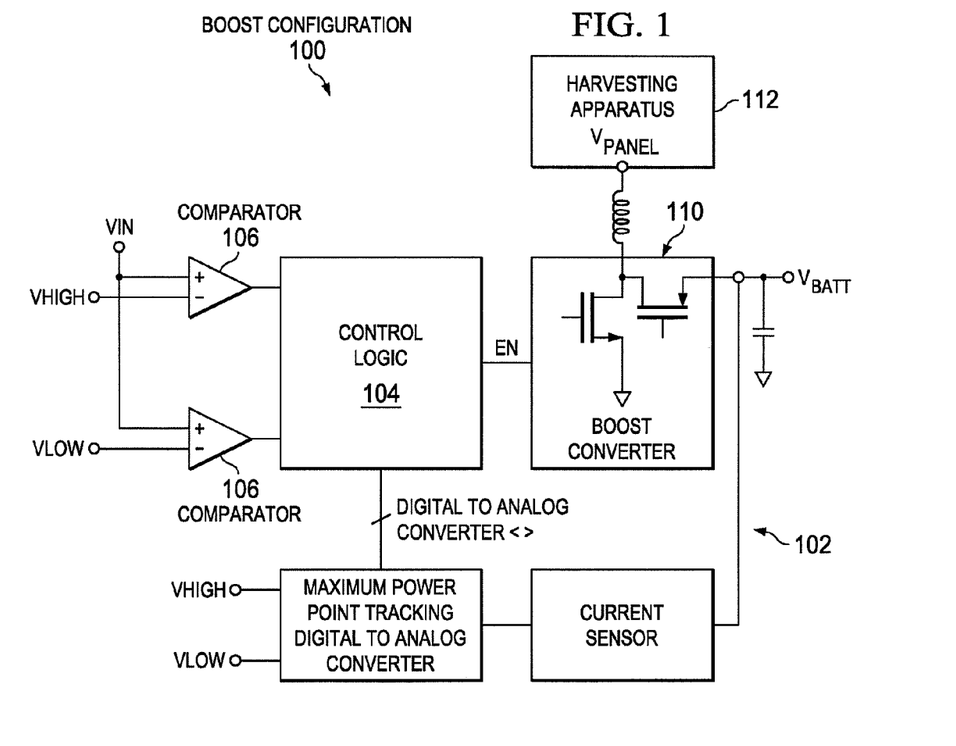
FIG. 1 is a simplified schematic drawing illustrating an example of a preferred embodiment of a variable power energy harvesting system in a fixed voltage boost configuration.

Initially referring primarily to FIG. 1, an exemplary embodiment of a variable power energy harvesting system 100 has a control loop 102, which includes control logic 104. The system uses comparators 106 to assess the available harvested voltage, e.g., $V_{PANEL}$ in relation to preselected high and low levels. A boost converter 110 with the low-power hysteretic control loop 102 based on harvested voltage $V_{PANEL}$ is used to regulate the power harvesting apparatus, in this example solar panel array 112, at its MPPT (Maximum Power Point Tracking) voltage. The hysteretic control loop 102 may be run as the only control, or may be used in conjunction with additional control(s) when the available harvested power is sufficient to power additional control circuitry.

Figure 2:
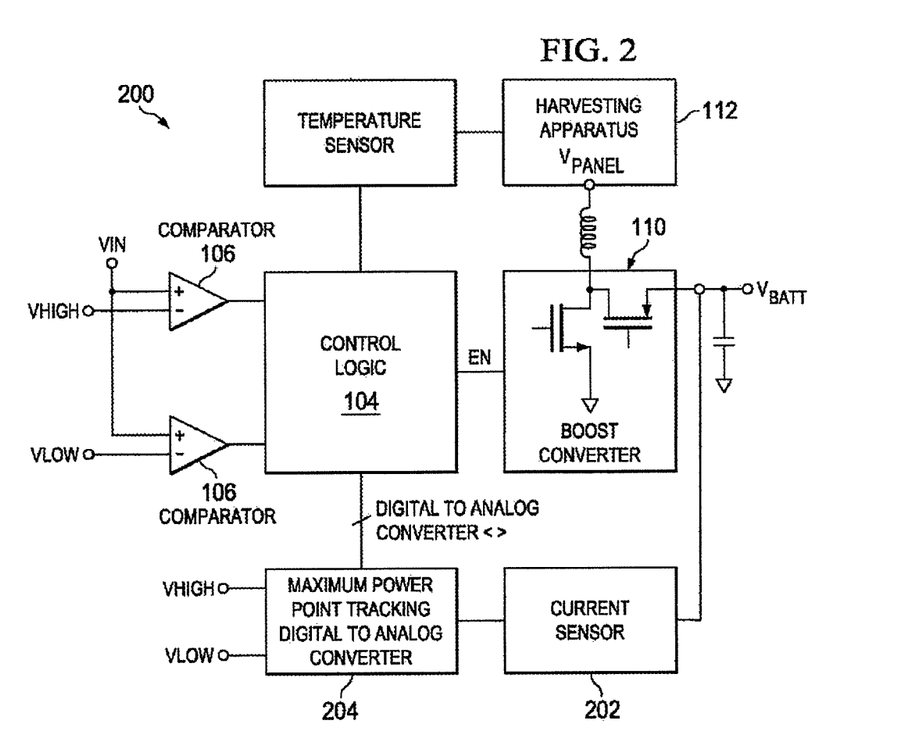
FIG. 2 is a simplified schematic drawing illustrating an example of a preferred embodiment of a variable power energy harvesting system in a temperature sensitive boost configuration.

For example, the system may include the capability to detect the condition that power is being delivered to a load above a threshold level, and then engage a more sophisticated MPPT regulation control. The power required for the operation of the MPPT regulation is preferably small relative to the available harvested power. Optionally, a temperature sensor may be provided for monitoring operating temperature. Operating temperature may be used to adjust the harvested voltage based on temperature-induced effects on system performance. Now referring primarily to FIG. 2, an example of an embodiment of such a variable power energy harvesting system 200 is shown. It has been found that actively monitoring output power $V_{BATT}$ enables the system to choose the optimum harvested voltage $V_{PANEL}$ to maximize power output, e.g., $V_{BATT}$, realized from the solar panel array 112. A suitable current sensor 202 is used to track the output $V_{BATT}$. In the event the harvested voltage $V_{PANEL}$ is less than output voltage $V_{BATT}$, as determined by the sensor 202, the control logic 104 may be used to select the optimal output voltage level $V_{BATT}$ with a view toward maximizing power harvested ($V_{PANEL}$) from the solar panel 112. The current sensor 202 and MPPT (digital to analog converter) DAC 204 provide the functionality needed by the control loop 102 to improve the energy harvesting efficiency of the system 200 based on the conditions experienced by the energy source, e.g. solar panel 112, that affect the voltage available (e.g., $V_{PANEL}$) for use by the system 200. In the case of low-power applications for which it is particularly desirable to monitor the load, such as portable electronics powered by a battery, the system 200 may be configured to briefly wake up to check the status of the load, e.g., $V_{BATT}$, and determine whether conditions allow the system to continue charging. This wake up is preferably operated at a relatively low duty cycle, so as to not dramatically change the power delivered to the load $V_{BATT}$.

Figure 3:
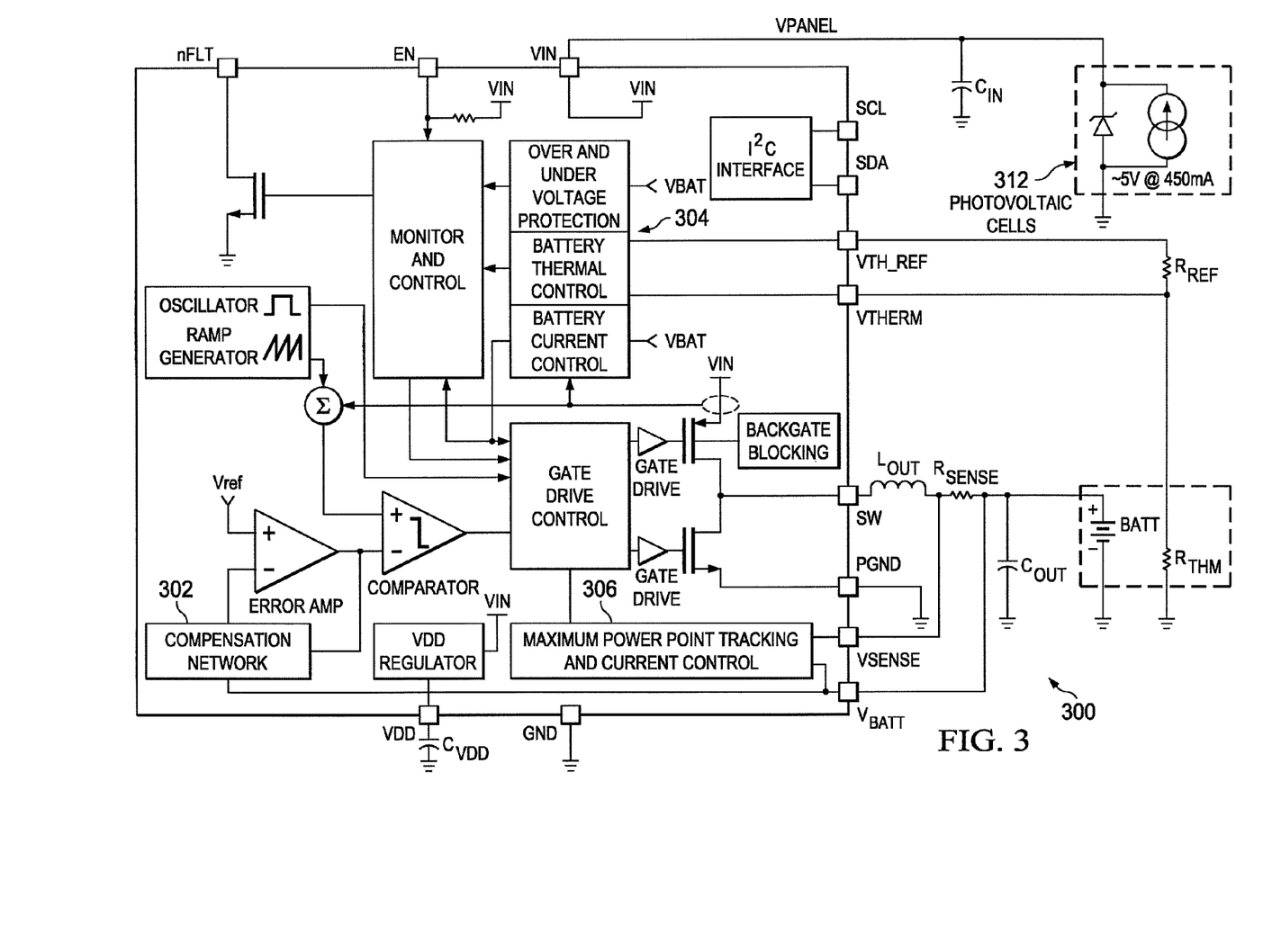
FIG. 3 is a simplified schematic drawing providing an alternative view of an example of a preferred embodiment of a variable power energy harvesting system in a boost configuration.
Figure 4:
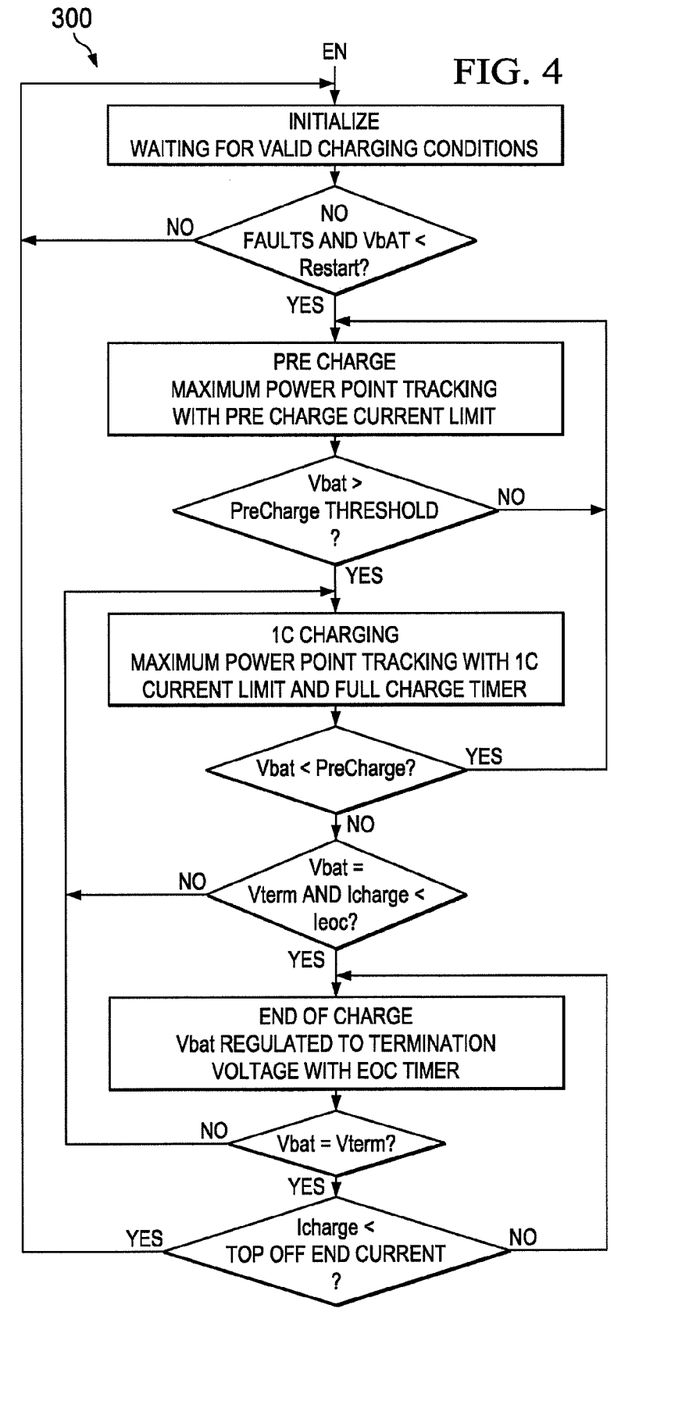
FIG. 4 is a process flow diagram illustrating an example of the operation of a preferred embodiment of a variable power energy harvesting system.

Alternative views of an exemplary embodiment of a variable power energy harvesting system are shown in FIG. 3, depicting a schematic diagram of the system 300, and FIG. 4, illustrating the operation of the system 300. In this example, a DC/DC synchronous switching Li-ion Battery Charger system 300 includes fully integrated power switches, internal compensation 302, and full fault protection 304. The system 300 utilizes temperature-independent photovoltaic Maximum Power Point Tracking (MPPT) circuitry 306 to provide power output $V_{BATT}$ from energy harvesting apparatus 312 during Full Charge Constant-Current (CC) mode. A preferred switching frequency of 1 MHz enables the use of small filter components, resulting in system size and cost advantages. In a presently preferred embodiment, in Full-Charge mode the duty cycle is controlled by the MPPT regulator 306. Once termination voltage is reached, the regulator operates in voltage mode. When the regulator is disabled (EN is low), the system draws less than 10uA quiescent current.

Now referring primarily to FIG. 4, an example of the operation of the variable power energy harvesting system in the context of a solar battery charger is shown. When the output voltage, such as battery charging voltage, is at a low threshold, e.g., below 3.0 volts in this example, the system 300 enters a pre-charge state and applies a small, programmable charge current to safely charge the battery to a level for which full charge current can be applied. Once the full charge mode has been initiated, the system 300 attempts to maximize available charge current to the battery by adjusting its duty cycle to regulate its input voltage to the MPP voltage of the energy harvesting apparatus, in this example photovoltaic cells. If sufficient current is available from the PV cell to exceed the safe 1C charge rate of the battery, then the programmable 1C current limit function will take priority over the MPP control function and the PV cell voltage will rise above the MPP value. When the battery voltage has increased sufficiently to warrant entering a maintenance mode (constant voltage), the PWM control loop forces a constant voltage across the battery. Once in constant voltage mode, current is monitored to determine when the battery is fully charged. This regulation voltage as well as the 1C charging current may be set to change based on battery temperature. For example, in a preferred embodiment, there are four temperature ranges which may be set independently, for example, 0-10° C., 10-45° C., 45-50° C. and 50-60° C. The 0° C. and 60° C. thresholds stop charging and have 10 degrees of hysteresis. The intermediate points have 1 degree of hysteresis. A thermal shutdown is also provided. In the event the temperature of the system exceeds 170° C. (in typical implementations), the SW outputs tri-state in order to protect the system 300 from damage. The nFLT and all other protection circuitry remains active to inform the system 300 of the failure mode. Once the system 300 cools sufficiently, e.g., to 160° C. (typical), the system 300 attempts to restart. If the system 300 reaches 170° C., the shutdown/restart sequence repeats. An internal current limit is preferably maintained. The current through the inductor is sensed on a cycle by cycle basis and in the event a selected current limit is reached, the cycle is abbreviated. Current limit is always active when the regulator is enabled. An under-voltage lockout feature is also preferably provided. In this example, the system 300 is held in the "off" state until the harvested voltage $V_{PANEL}$ reaches a selected threshold, 3.6V, for example. There is preferably a 200 mV hysteresis on this input, which requires the input to fall below 3.4V before the system 300 disables. A battery over-voltage protection circuit designed to shutdown the charging profile if the battery voltage is greater than the termination voltage is also preferably provided. The termination voltage may preferably be changed based on user programming, so the protection threshold is set to 2% above the termination voltage. Shutting down the charging profile puts the system in a fault condition.

Figure 5:
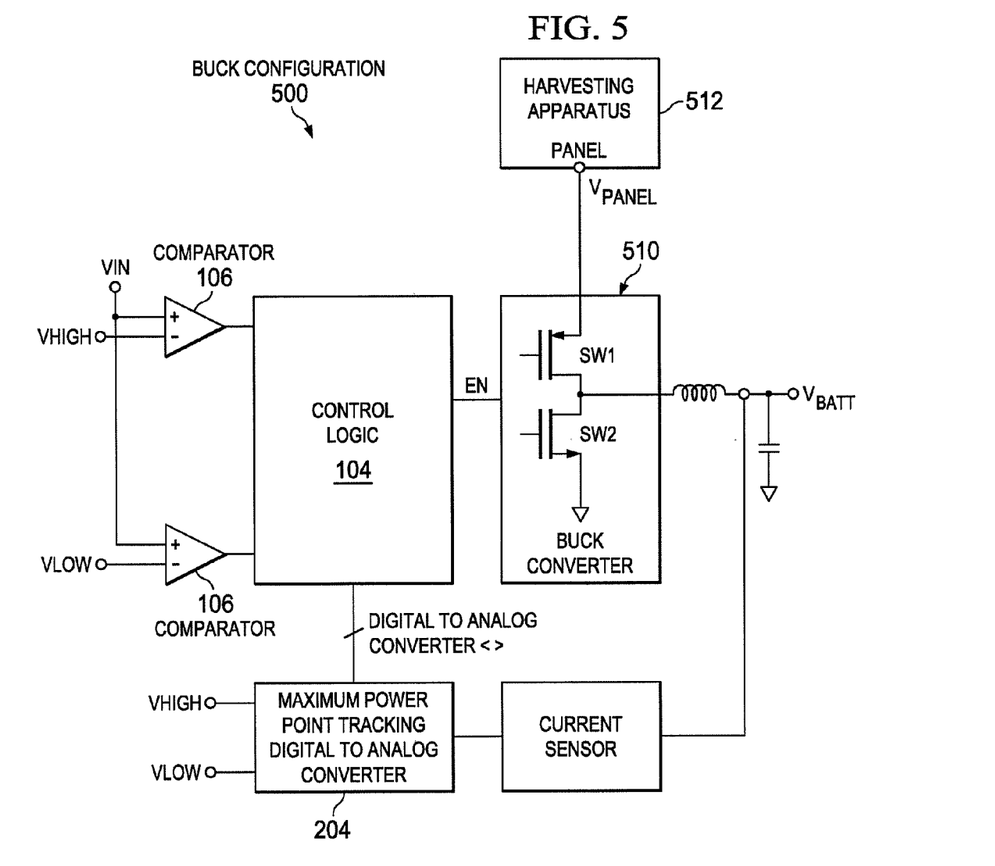
FIG. 5 is a simplified schematic drawing illustrating an example of a preferred embodiment of a variable power energy harvesting system in a buck configuration.

A variable power energy harvesting system 500 is depicted in FIG. 5. In this exemplary preferred embodiment, a buck converter configuration is shown. In this system 500, the design is configured to anticipate the operational condition that the harvested voltage $V_{PANEL}$ may be greater than the required output voltage $V_{BATT}$. When the available harvested power is too low to power any active control circuitry, the pass device (SW1) in the buck converter 510 switches to the "on" state. This does not allow MPPT to function, but can nevertheless provide the highest output power because the system power overhead can be almost zero. As an alternative, this can also be done with a parallel switch to the main pass device. Similar to boost mode, the device can briefly wake up to check load status and available harvested power, e.g., $V_{PANEL}$. Again, this should be at a low enough duty cycle to not dramatically change the power delivered to the load. A second mode of operation in a buck configuration is a low power hysteretic control based on the harvested voltage ($V_{PANEL}$). This requires some power overhead, so the available power should be sufficient to run the required circuitry. Similar to the hysteretic control in the boost mode, this can be to a fixed voltage, a changing voltage based on temperature, or an active control that monitors the output power to regulate the energy harvesting apparatus, e.g., panel 512, to its MPPT voltage. Finally, in the event the available power is sufficient, a more sophisticated control may be activated to allow for better MPPT regulation. The efficiency gains from better MPPT regulation should be significant enough to overcome the additional power overhead in running the additional control.

Figure 6:
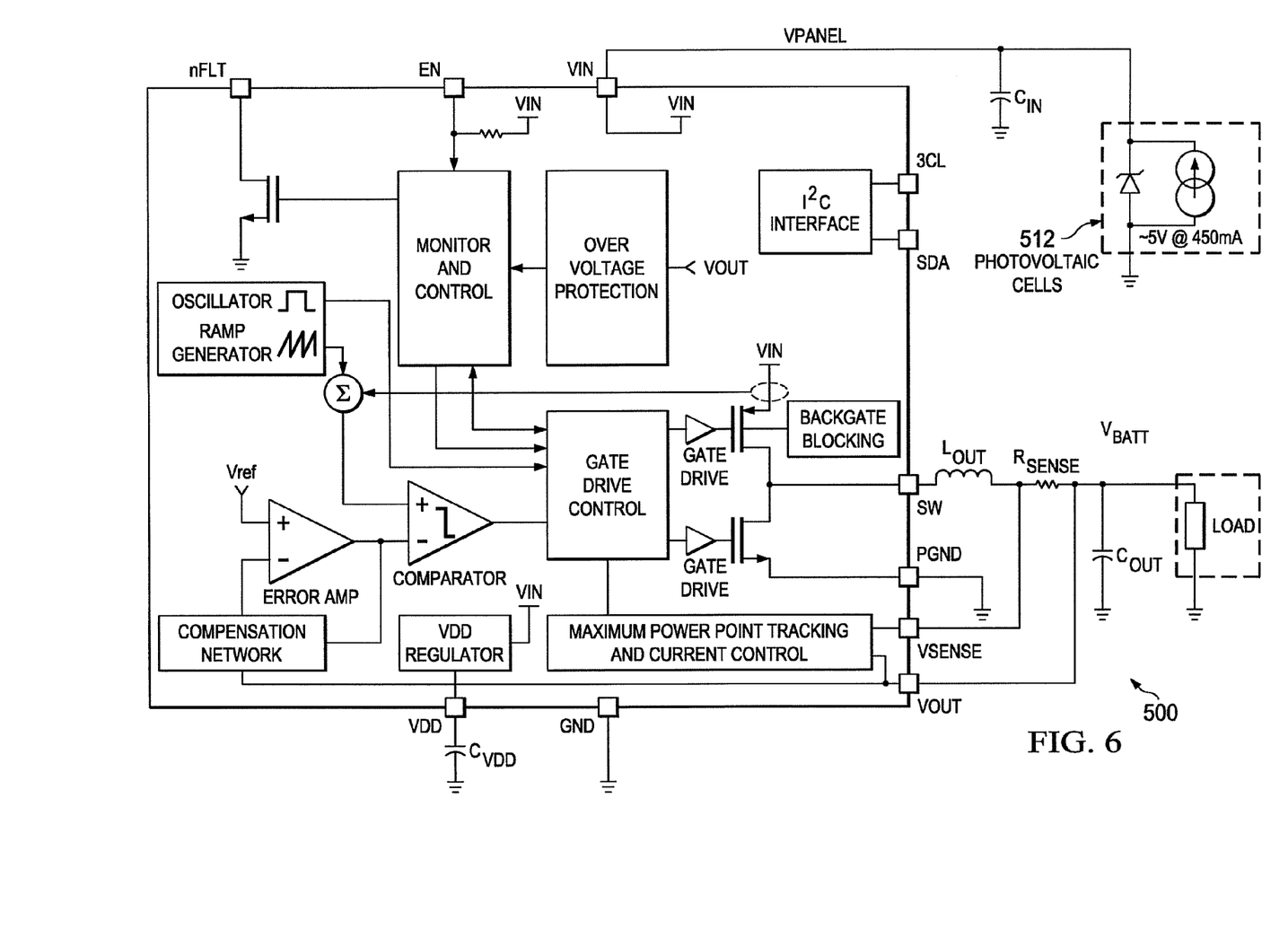
FIG. 6 is a simplified schematic drawing providing an alternative view of an example of a preferred embodiment of a variable power energy harvesting system in a buck configuration.

Alternative views of an exemplary embodiment of a variable power energy harvesting system having a buck converter are shown in FIG. 6. In preferred embodiments, a "power good" (PG) pin is used to indicate a fault condition or inability to charge. The output is an open-drain type. When EN is low, the system 500 is nominally active. Assuming no fault conditions, the PG pin is open. An external resistor R connected between the PG pin and an external I/O rail pulls the PG output up to the rail voltage, indicating that charging is underway. In the event a fault occurs, the PG pin is pulled to ground. The three events which can trigger a PG fault indication are preferably, input under-voltage, output over-voltage, and thermal shutdown.

In preferred embodiments, the boost configuration of the system 500 is a DC/DC synchronous switching boost converter with fully integrated power switches, internal compensation, and full fault protection. A temperature-independent photovoltaic Maximum Power Point Tracking (MPPT) system 500 thus embodied endeavors to maximize output current to the load, making it advantageous as a supply for battery charging applications. A switching frequency of 2 MHz is preferably chosen to enable the use of small external components for portable applications. Examples of the operation of the system 500 are described for two typical scenarios. In one example, an intermediate charger circuit may be used between the system 500 and a battery or other storage element. The terminal voltage is set high. When the system starts up and ramps the output voltage above the PG threshold, the PG flag is set. Until the load is capable of sinking the full amount of current available from the boost converter, the output rises to the light load regulation value of 5.0V. Once sufficient load is applied to the system, the load itself determines the output voltage of the converter. In this case, the MPP tracking function adjusts the harvested input voltage of the system in order to maximize the output current (and thus output power) into the load. In another example, the system may be used to directly charge a Li-Ion Battery, with the terminal VTERM set low. Insolation of the PV panel allows immediate charging of the battery. The MPP tracking function works to deliver the maximum possible charge current to the battery until the termination voltage of 4.0V is reached. At this point, the device automatically transitions to an accurate voltage regulation mode to safely maintain a full charge on the battery. The current through the inductor is sensed on a cycle by cycle basis and if current limit is reached, the cycle is abbreviated. Current limit is always active when the boost converter is enabled. If the temperature of the system exceeds a selected threshold, such as 150° C., for example, the SW outputs tri-state in order to protect the system from damage. The PG and all other protection circuitry remain active to inform the system of the failure mode. Once the system cools to a lower threshold, e.g., 140° C., the system attempts to restart. In the event the system again reaches 150° C., the shutdown/restart sequence repeats. The PG output is pulled low to signal the existence of a fault condition. The system 500 preferably also has an output over-voltage protection circuit 504 which prevents the system 500 from reaching a dangerously high voltage under sudden light load conditions. The typical over-voltage detection threshold is 102% of the terminal voltage value. In the event of such a condition, the PG output is pulled low to signal a fault condition. Input under-voltage protection 504 is also preferably provided. The system 500 monitors its input voltage and does not permit switching to occur when the input voltage drops below a selected threshold, e.g., 250 mV. Switching resumes automatically once the input voltage is above a higher selected threshold, e.g., 275 mV. In addition, the PG output is pulled low to signal a fault condition.

Figure 7:
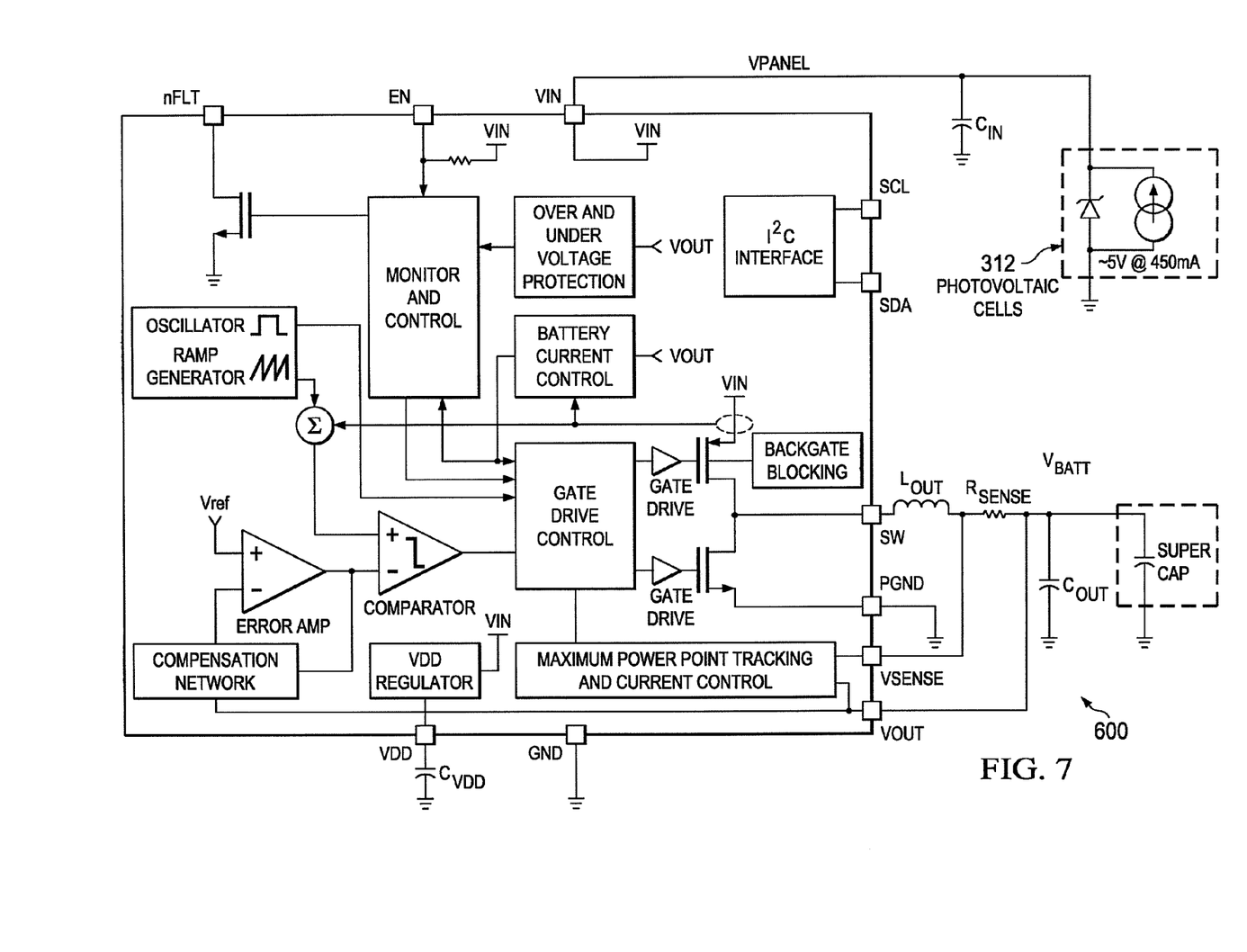
FIG. 7 is a simplified schematic drawing illustrating an example of a preferred embodiment of a variable power energy harvesting system in a boost-buck configuration.

As shown in FIG. 7, the variable power energy harvesting system may be implemented in a buck-boost configuration 600, that is, a configuration in which the harvested voltage $V_{PANEL}$ may be greater or less than the load voltage $V_{BATT}$. This can be done with all or part of the features of the boost and buck configurations shown and described herein working in parallel with a control mechanism to select which function should be active under given conditions. The buck-boost system 600 is a DC/DC synchronous switching charge controller which utilizes a temperature-independent photovoltaic Maximum Power Point Tracking (MPPT) circuit in efforts to optimize power from energy harvesting apparatus such as a solar panel. The system 600 controls FET devices in buck, boost, and buck/boost configurations in order to support a wide range of system power levels and output voltages. A preferred 100 kHz switching frequency results in low system quiescent current levels. The system 600 includes integrated battery charge controls for Li-Ion, NIMH and lead acid batteries. In Full-Charge mode the duty cycle is controlled by the MPPT regulator.

Figure 8:
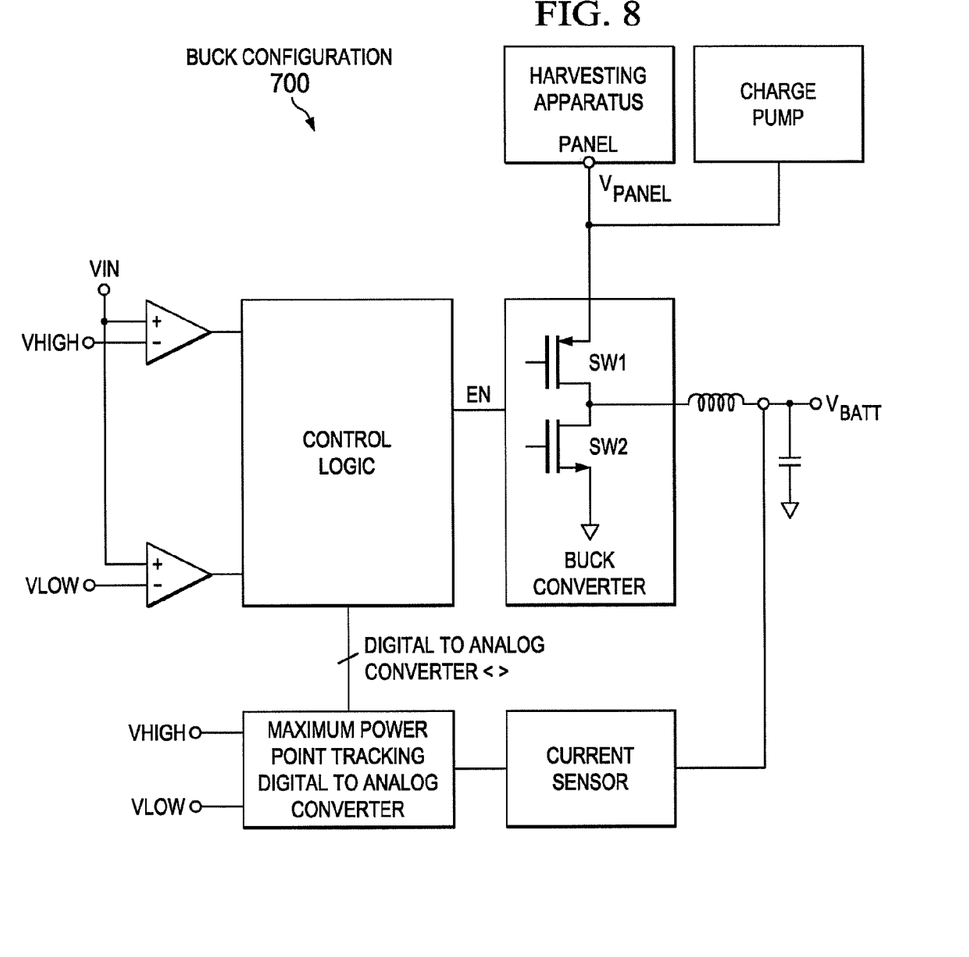
FIG. 8 is a simplified schematic drawing illustrating an example of a preferred embodiment of a variable power energy harvesting system in a buck configuration having a parallel charge pump.

FIG. 8 illustrates an implementation of a variable power energy harvesting system 700 demonstrating a buck configuration similar to that shown and described with reference to FIGS. 1-4, with the addition of a parallel charge pump to work when the harvested voltage $V_{PANEL}$ is below the output $V_{BATT}$. This charge pump is controlled to run when the harvested voltage $V_{PANEL}$ is within a certain voltage range.

Any of the above configurations can be combined with a traditional MPPT component. The system may be operated with the traditional MPPT solution in a standby low power state while one of the above configurations is active, and then begin to run when the available power is sufficient to run the traditional solution.

Figure 9:
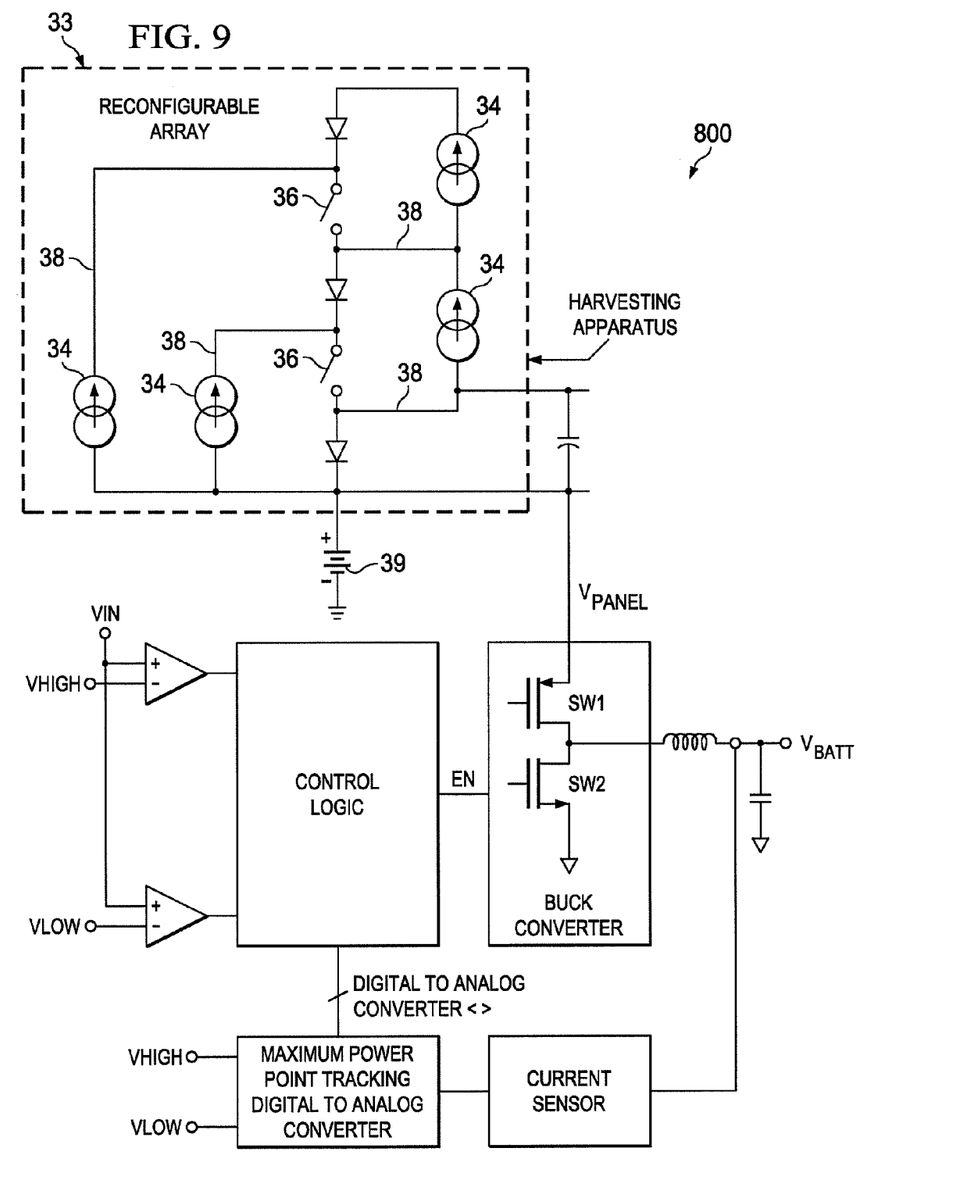
FIG. 9 is a simplified schematic drawing illustrating an example of a preferred embodiment of a variable power energy harvesting system having a configurable stack of energy harvesting apparatus and integrated storage capacitors.

An additional alternative feature of a variable power energy harvesting system 800 is shown in FIG. 9. This embodiment illustrates a configuration in which, under ultra-low power conditions, the energy harvesting apparatus, such as an array of PV panels, can be reconfigured to reduce losses. A PV panel is configured such that the cells may be recombined in series and/or parallel combinations in order to set the MPPT voltage of the panel to approximate the voltage of the load. In this case, the load may be connected directly to the panel output or a simple linear circuit may be used to connect the load. The reconfiguring of the stack may be controlled by polling the conditions or as part of a control loop to maximize energy harvesting.

Alternatively, or additionally, a single capacitor or array of capacitors may be connected to all or some portion(s) of the energy harvesting apparatus such as a solar panel stack. Once these capacitors receive a level of charge from the energy harvesting stack, e.g., solar cells, this charge may be combined together or transferred to the power control circuitry for output. These capacitors are preferably controlled such that the voltage on the capacitors is held close to the MPP voltage of the energy harvesting apparatus. In the event of a low energy harvesting level, e.g., some of the solar panel is blocked so that it is not producing sufficient power, the capacitors are used to provide substitute power in the interim until a higher energy harvesting level is achieved.

Many variations are possible within the scope of the invention. In preferred embodiments, the apparatus of the invention preferably includes circuitry adapted to provide the capability to regulate various levels of power produced by associated energy harvesting apparatus. For purposes of clarity, detailed descriptions of functions, components, and systems familiar to those skilled in the applicable arts are not included. The methods and apparatus of the invention provide one or more advantages including but not limited to, improved energy harvesting efficiency and/or improved operating ranges for energy harvesting systems. While the invention has been described with reference to certain illustrative embodiments, those described herein are not intended to be construed in a limiting sense. For example, variations or combinations of functions and/or materials in the embodiments shown and described may be used in particular cases without departure from the invention. Various modifications and combinations of the illustrative embodiments as well as other advantages and embodiments of the invention will be apparent to persons skilled in the arts upon reference to the drawings, description, and claims.

We claim:

1. A single-chip system for harvesting energy from a variable output energy harvesting apparatus comprising:
   energy harvesting apparatus for providing energy input;
   a switched mode power supply operably coupled to receive the input of the energy harvesting apparatus, and for providing a system output power signal; and
   a control loop having control logic for dynamically adjusting energy harvesting apparatus input to the switched mode power supply, thereby regulating the system output power signal, wherein the control loop further comprises a maximum power point tracking (MPPT) function and a function that is configured to exceed an MPPT mode voltage level.

2. A system for harvesting energy according to claim 1 wherein the energy harvesting apparatus further comprises one or more photovoltaic cells coupled to the single chip system.

3. A system for harvesting energy according to claim 1 wherein the switched mode power supply further comprises a boost configuration contained in the single chip system with battery thermal control circuitry.

4. A system for harvesting energy according to claim 1 wherein the switched mode power supply further comprises a buck configuration contained in the single chip system with over and under voltage protection circuitry.

5. A system for harvesting energy according to claim 1 wherein the switched mode power supply further comprises a buck-boost configuration contained in the single chip system.

6. A system for harvesting energy according to claim 1 wherein the switched mode power supply is adapted to provide low power input voltage regulation contained in the single chip system.

7. A system for harvesting energy according to claim 1 wherein the switched mode power supply is adapted to provide low power temperature independent MPPT regulation.

8. A system for harvesting energy according to claim 1 wherein the switched mode power supply is adapted to provide hysteretic input voltage regulation.

9. A system for harvesting energy according to claim 1 wherein the switched mode power supply is adapted to provide a low power mode and polling capability contained in the single chip system.

10. A system for harvesting energy according to claim 1 wherein the switched mode power supply is adapted to provide a low power linear mode contained in the single chip system.

11. A system for harvesting energy according to claim 1 further comprising a charge pump in parallel with the switched mode power supply contained in the single chip system.

12. A system for harvesting energy according to claim 1 wherein the energy harvesting apparatus further comprises a plurality of energy harvesting devices in a reconfigurable stack coupled to the single chip system.

13. A system for harvesting energy according to claim 1 further comprising one or more storage capacitors interposed between the energy harvesting apparatus single chip system.

14. A system for harvesting energy according to claim 1 further comprising a load operably coupled to the single chip system for receiving the system output power signal.

15. A system for harvesting energy from variable output energy harvesting apparatus comprising:
an energy harvesting apparatus configured to provide an energy input;
a single chip system comprising:
a switched mode power supply operably coupled to receive the input of the energy harvesting apparatus, and configured to provide a system output power signal; and
a control loop having control logic configured to dynamically adjust the energy input to the switched mode power supply as a function of battery hysteresis using a maximum power point tracking (MPPT) function and a function that is configured to exceed an MPPT mode voltage level.

16. A system for harvesting energy according to claim 15 wherein the switched mode power supply is adapted to provide low power temperature-independent MPPT regulation.

17. A system for harvesting energy variable output energy harvesting apparatus comprising:
an energy harvesting apparatus for providing energy input;
a single chip system comprising:
a switched mode power supply operably coupled to receive the input of the energy harvesting apparatus, and configured to provide a system output power signal; and
a control loop having control logic configured to dynamically adjust an energy harvesting apparatus input to the switched mode power supply, wherein the control loop is configured to perform maximum power point tracking (MPPT) and to exceed an MPPT mode voltage level as a function of one or more input conditions.

18. A system for harvesting energy according to claim 17 wherein the switched mode power supply is adapted to provide a low power mode and polling capability.

* * * * *

UNITED STATES PATENT AND TRADEMARK OFFICE
CERTIFICATE OF CORRECTION

PATENT NO. : 9,653,944 B2
APPLICATION NO. : 14/982893
DATED : May 16, 2017
INVENTOR(S) : Ross Teggatz et al.

Page 1 of 1

It is certified that error appears in the above-identified patent and that said Letters Patent is hereby corrected as shown below:

On the Title Page

1. In Item (72), under "Inventors", in Column 1, Line 1, delete "Wayne" and insert -- Wayne T. --, therefor.

In the Claims

2. In Column 8, Line 41, in Claim 1, delete "energy harvesting" and insert -- an energy harvesting --, therefor.

3. In Column 9, Line 31, in Claim 13, delete "apparatus single" and insert -- apparatus and the single --, therefor.

4. In Column 9, Line 36, in Claim 15, delete "from variable" and insert -- from a variable --, therefor.

5. In Column 10, Line 17, in Claim 17, delete "energy variable" and insert -- energy from a variable --, therefor.

Signed and Sealed this
Seventeenth Day of October, 2017

Joseph Matal
*Performing the Functions and Duties of the
Under Secretary of Commerce for Intellectual Property and
Director of the United States Patent and Trademark Office*